(12) United States Patent
Kakitsuba

(10) Patent No.: US 11,733,937 B2
(45) Date of Patent: Aug. 22, 2023

(54) SUPPORT PROGRAM, INFORMATION PROCESSING DEVICE, AND PRINTING METHOD

(71) Applicant: BROTHER KOGYO KABUSHIKI KAISHA, Nagoya (JP)

(72) Inventor: Ryota Kakitsuba, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 3 days.

(21) Appl. No.: 17/212,407

(22) Filed: Mar. 25, 2021

(65) Prior Publication Data
US 2021/0232350 A1 Jul. 29, 2021

Related U.S. Application Data

(63) Continuation of application No. PCT/JP2020/025800, filed on Jul. 1, 2020.

(30) Foreign Application Priority Data
Sep. 30, 2019 (JP) .............................. JP2019-179039

(51) Int. Cl.
*G06F 3/12* (2006.01)
*G06K 15/02* (2006.01)

(52) U.S. Cl.
CPC .......... *G06F 3/1206* (2013.01); *G06F 3/1242* (2013.01); *G06K 15/1836* (2013.01)

(58) Field of Classification Search
None
See application file for complete search history.

(56) References Cited

U.S. PATENT DOCUMENTS

2002/0016799 A1* 2/2002 Nakagiri ................ G06K 15/00
715/246
2012/0127499 A1 5/2012 Takashima

FOREIGN PATENT DOCUMENTS

JP 2002-079716 A 3/2002
JP 2007-133756 A 5/2007
(Continued)

OTHER PUBLICATIONS

Riso Kagaku Corp, Image Forming Apparatus and Program Therefor, May 31, 2007, pp. 1-12, Machine Translation of JP 2007133756 ("17212407_JP2007_133756_Translation.pdf") (Year: 2007).*
(Continued)

*Primary Examiner* — Dov Popovici
(74) *Attorney, Agent, or Firm* — Scully, Scott, Murphy & Presser, PC

(57) ABSTRACT

A support program is executable by a computer of an information processing device and supports a printer connected to the information processing device. The support program causes the computer to execute, determination processing of receiving print data corresponding to images having a plurality of pages from a general-purpose print program of an operating system and, based on the received print data, determining an arrangement order of the images according to the number of pages for one volume in a booklet printing, and composite image output control processing of transmitting the composite print data, which is made by rasterizing the composite image in which the images corresponding to the two target pages are arranged so as to fit on one surface of each sheet based on the arrangement order determined in the determination processing, from the information processing device to the printer.

12 Claims, 10 Drawing Sheets

(56) References Cited

FOREIGN PATENT DOCUMENTS

| | | |
|---|---|---|
| JP | 2011-95912 A | 5/2011 |
| JP | 2012-113356 A | 6/2012 |
| JP | 2017-045260 A | 3/2017 |

OTHER PUBLICATIONS

International Search Report with translation and Written Opinion with partial translation dated Sep. 8, 2020 issued in PCT application No. PCT/JP2020/025800.

* cited by examiner

FIG. 2

| MODEL NAME | CONVEYANCE METHOD | REARRANGEMENT NECESSITY INFORMATION |
|---|---|---|
| M1 | SINGLE-SHEET CONVEYANCE METHOD | NECESSARY |
| M2 | TWO-SHEET SIMULTANEOUS CONVEYANCE METHOD | NECESSARY |
| M3 | INTERLEAVE METHOD | UNNECESSARY |

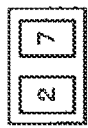 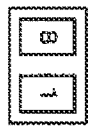 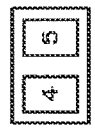 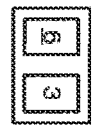
FIG. 7H
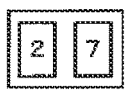 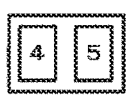  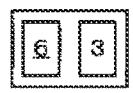
FIG. 7G
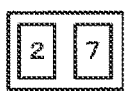 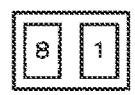 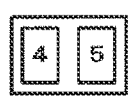 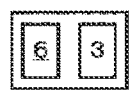
FIG. 7F
 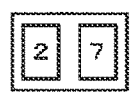 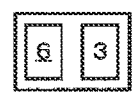 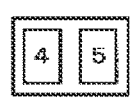
FIG. 7E
       
FIG. 7D
       
FIG. 7C
FIG. 7B
       
FIG. 7A

SUPPORT PROGRAM, INFORMATION PROCESSING DEVICE, AND PRINTING METHOD

CROSS-REFERENCE TO RELATED APPLICATIONS

This is a continuation application of International Application No. PCT/JP2020/025800 filed on Jul. 1, 2020 which claims priority from Japanese Patent Application No. 2019-179039 filed on Sep. 30, 2019. The entire contents of the earlier applications are incorporated herein by reference.

TECHNICAL FIELD

The technical field disclosed in the present specification relates to a support program that supports printer control, an information processing device, and a printing method.

BACKGROUND ART

As a technique of controlling a printer from an information processing device including a personal computer, for example, as disclosed in JP-A-2011-95912, there is a widely known configuration in which a job is input to the printer by a printer driver, wherein the job is set with booklet printing that can form a booklet by printing two pages each on both sides of a sheet, stacking a plurality of printed sheets, and folding the stacked printed sheets in half.

In recent years, a technique of controlling a printer by a print program that is installed in an operating system (OS) as a standard function without using the printer driver described above has been put into practical use. In this technique, when the OS associates the printer with the OS standard print program and subsequently receives a print instruction for the printer, it is possible to print using the OS standard print program without using the printer driver.

However, in the printing by the OS standard general-purpose print program, selectable setting items are limited to generally registered items in the OS standard print program when the print parameters are selected. As a result, booklet printing may not be supported, which causes the user inconvenience.

The present specification discloses a technique for causing a printer to perform booklet printing in an information processing device having an OS standard print program incorporated therein.

SUMMARY OF INVENTION

According to an aspect of the present disclosure, a non-transitory computer readable medium stores a program causing a computer installed in an information processing device to execute a process for supporting a booklet printing by a printer connected to the information processing device. The process includes, in a case where a print instruction output from an application program installed in the information processing device and causing the printer to print images is sent to a general-purpose print program pre-installed in an operating system of the information processing device, and in a job based on the print instruction, the printer is caused to execute booklet printing for making a booklet by printing two pages each on both sides of a sheet, stacking a plurality of printed sheets, and folding the stacked printed sheets in half, determining an arrangement order of the images according to the number of pages for one volume in the booklet printing based on print data corresponding to the images having a plurality of pages and being received from the general-purpose print program, performing composite image output control of transmitting the composite print data, which is made by rasterizing the composite image in which the images corresponding to the two target pages are arranged so as to fit on one surface of each sheet based on the arrangement order determined in the determination of the arrangement order, from the information processing device to the printer.

In the support program having the above-described configuration, when the general-purpose print program installed in OS has a print instruction and causes the printer to execute booklet printing in a job based on the print instruction, the support program rearranges the arrangement order of images of a plurality of pages according to the number of pages in one volume in the booklet printing. Then, the support program controls the information processing device so that the composite print data of the composite images in the print order according to the sheet conveyance mode of the printer is output. This allows the support program to support booklet printing even when the general-purpose print program does not support booklet printing.

A control method for realizing the function of the support program and a computer-readable storage medium storing the support program are also novel and useful.

According to the technique disclosed in the present specification, it is possible to cause a printer to perform booklet printing in an information processing device in which an OS standard print program is installed.

BRIEF DESCRIPTION OF DRAWINGS

FIG. 2 is a diagram showing an example of a configuration of an auxiliary DB:

FIGS. 7A to 7H are diagrams illustrating the handling of data:

DETAILED DESCRIPTION OF EMBODIMENTS

Hereinafter, a personal computer (hereinafter, referred to as a "PC") that uses the program of a first embodiment will be described in detail with reference to the accompanying drawings. This embodiment discloses an embodiment embodying a program executed by a PC connected to a printer having a printing function.

Figure 1:
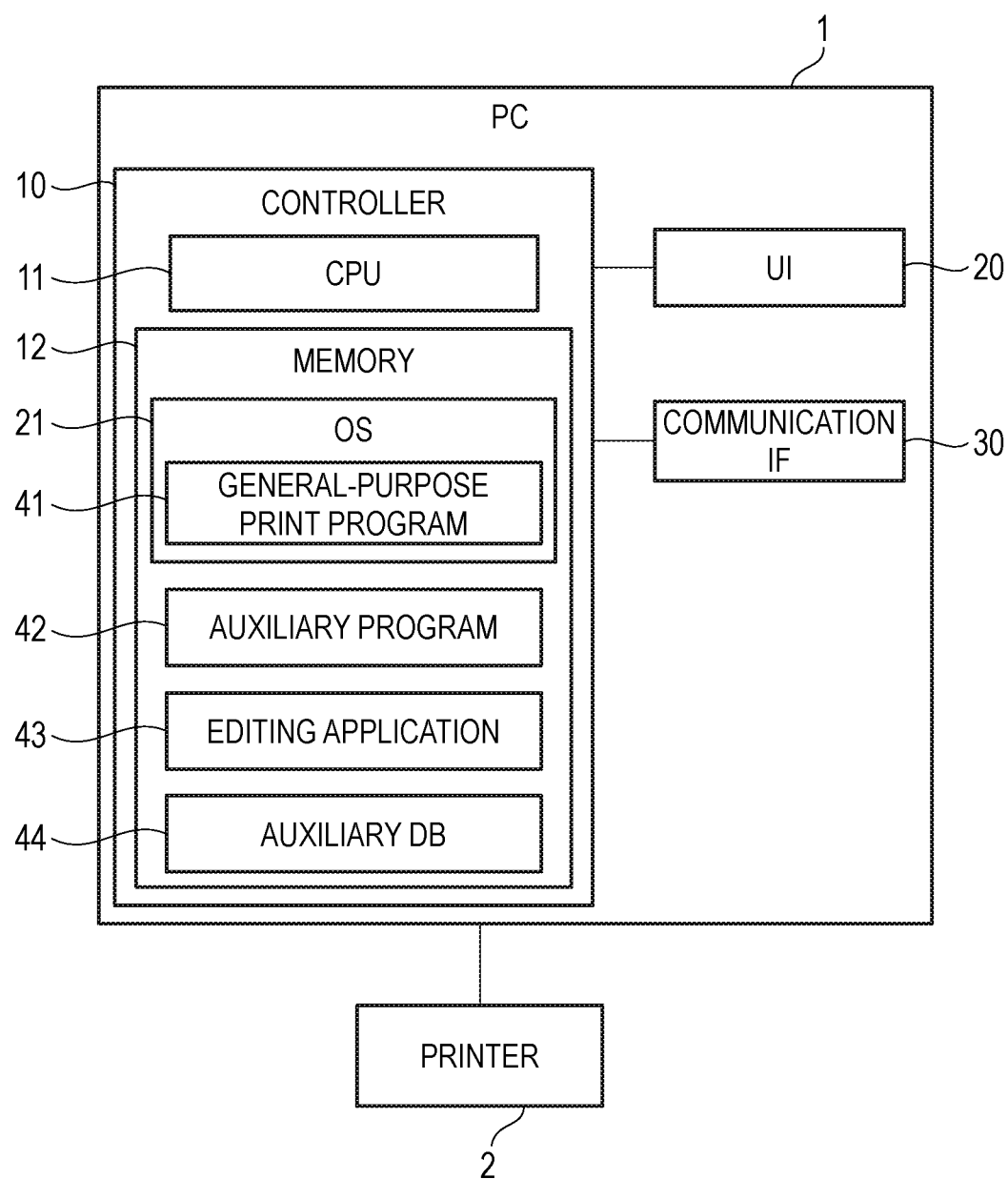
FIG. 1 is a block diagram showing the electric configuration of a PC.

A PC 1 of the present embodiment includes, for example, as shown in FIG. 1, a controller 10, a user interface (hereinafter referred to as "UI") 20, and a communication interface (hereinafter referred to as "communication IF") 30. The UI 20 and the communication IF 30 are electrically connected to the controller 10. The PC 1 is an example of an information processing device. A printer 2 is a device having a printing function and is connected to the PC 1 via local communication or network communication. The printer 2 may incorporate a post-processing device capable of automatically creating a booklet.

The UI 20 includes hardware that performs various displays and receives an instruction input by a user. The UI 20 may be a touch panel having both a display function and an input receiving function or may be a combination of a display having a display function and a keyboard or mouse having an input receiving function.

The communication IF 30 includes hardware for communicating with an external device including the printer 2 and hardware for accessing the Internet. The communication IF 30 may include a plurality of interfaces having different communication methods. Communication methods may include network communication and USB communication. Further, the communication may be wired communication or wireless communication.

The controller 10 includes a CPU 11 and a memory 12. The CPU 11 is an example of a computer. The memory 12 includes a ROM, a RAM, and a non-volatile memory and stores programs including various application programs (hereinafter referred to as "applications") and various data. The CPU 11 executes various processes according to the program read from the memory 12 and/or the user's instruction. The controller 10 in FIG. 1 is a collective term for hardware and software used for controlling the PC 1 and does not necessarily represent a single piece of hardware actually existing in the PC 1.

An example of the memory 12 may be a computer-readable storage medium. A computer-readable storage medium is a non-transitory medium. In addition to the above examples, the non-transitory medium includes a recording medium including a CD-ROM and a DVD-ROM. The non-transitory medium is also a tangible medium. On the other hand, an electric signal that carries a program downloaded from a server or the like on the Internet is a computer-readable signal medium that is a kind of computer-readable medium but is not included in the non-transitory computer-readable storage medium.

For example, as shown in FIG. 1, the memory 12 stores an OS 21 including a general-purpose print program 41, an auxiliary program 42, and an editing application 43. The auxiliary program 42 is an example of a support program. The editing application 43 is an example of an application program. The OS 21 is, for example, Microsoft Windows (registered trademark), MacOS (registered trademark), or Linux (registered trademark). The memory 12 stores various data including information on the connected printer 2 and various programs including a browser in addition to the illustrated ones.

The general-purpose print program 41 is an OS standard program for executing printing with various printers including the printer 2 according to an instruction from the PC 1. The general-purpose print program 41 of the present embodiment is a program including a function of generating print data used by a corresponding printer for printing based on image data to be printed.

The general-purpose print program 41 supports a function that is capable of being commonly used by printers of a plurality of types of models provided by vendors of various printers. It is difficult for the general-purpose print program 41 to support all the functions uniquely provided in various printers and the supported functions are limited to the general-purpose functions.

The auxiliary program 42 is a program or a program group that executes processing based on an instruction from the OS 21 accompanying activation of the general-purpose print program 41 and is an application that supports the control of target hardware. The auxiliary program 42 of this embodiment supports the model of the printer 2 connected to the PC 1 and is activated from the general-purpose print program 41, for example, when the general-purpose print program 41 is used to receive an instruction to cause the printer 2 to execute printing. The auxiliary program 42 is called, for example, a hardware support application (abbreviation: HSA).

The auxiliary program 42 receives a plurality of types of commands from the general-purpose print program 41 and executes various processes based on the received commands. The auxiliary program 42 is configured to execute different processes depending on the content of the execution command from the general-purpose print program 41. The auxiliary program 42 may be a combination of a plurality of programs that each receive an execution command or may be one program that is configured to execute different processes according to commands.

The auxiliary program may be a program prepared for each printer type by the printer vendor. For example, an auxiliary program for an inkjet printer or an auxiliary program for a laser printer is prepared. The printer vendor registers the auxiliary program in the platform provided by the OS21 vendor according to the procedure specified by the OS21 vendor. When a printer is newly connected to the PC 1 and an auxiliary program corresponding to the printer is registered in the platform, the OS 21 downloads the auxiliary program from a server storing the auxiliary program and installs the auxiliary program in the PC 1. Then, the OS 21 stores the identification information of the installed auxiliary program in the memory 12 in association with the printer information of the newly connected printer. There may be an auxiliary program prepared not only for each printer type but for each printer model or each printer model series.

In addition to the auxiliary program 42, an auxiliary database (hereinafter referred to as "auxiliary DB") 44 is incorporated in the OS 21 in a storage area for the auxiliary program 42 prepared in the memory 12. The auxiliary DB 44 is an example of a database. An example of the configuration of the auxiliary DB 44 will be described with reference to FIG. 2. The auxiliary DB 44 is a database that stores model names, conveyance methods, and rearrangement necessity information in association with each other for all models that the auxiliary program 42 can support.

The model name indicates the model of the printer. The model name is an example of model information. The conveyance method refers to a method in which the conveyance mechanism of the printer conveys the sheet. As the conveyance method, for example, a single-sheet conveyance method, a two-sheet simultaneous conveyance method, and an interleave method are stored. These conveyance methods will be described later. The conveyance method is an example of a conveyance mode. The rearrangement necessity information is information indicating the necessity of changing the arrangement order of the images. As the rearrangement necessity information, for example, "necessary" is stored which indicates that the arrangement order of the images needs to be changed for a printer model in which the memory capacity is small and the printer itself is not capable of rearranging images, in association with the model name. On the other hand, as the rearrangement necessity information, for example, "unnecessary" is stored which indicates that a change in the arrangement order of the images is not necessary for a model in which the memory capacity is large and the printer itself is capable of rearranging the images, in association with the model name.

Referring back to FIG. 1, the editing application 43 is, for example, an application for creating and editing image data and document data. The editing application 43 is, for example, Microsoft Word or PowerPoint. The editing application 43 may be an application provided by a vendor of the printer 2 or the like. The editing application 43 receives a user operation including an instruction to cause the printer 2 to perform a predetermined operation. Specifically, the editing application 43 receives, for example, a print instruction for causing the printer 2 to execute printing, via the UI 20.

The processing in the embodiment and each processing step in the flowchart basically indicate processing of the CPU 11 according to a command described in a program including the auxiliary program 42. That is, the processes including "determination", "extraction", "selection", "calculation", "decision", "specification", "acquisition", "reception", and "control" in the following description represent the processes performed by the CPU 11. The processing by the CPU 11 also includes hardware control using the API of the OS 21. In this specification, the operation of each program will be described by omitting the detailed description of the OS 21. That is, in the following description, the description that "the program B controls the hardware C" may mean that "the program B controls the hardware C using the API of the OS 21". Further, the processing of the CPU 11 according to the command described in the program may be described by using omitted wording. For example, a program may be omitted and described as "executed by the CPU 11". In addition, the processing of the CPU 11 according to the command described in the program may be described by the wording in which the CPU is omitted, such as "the program A performs".

Note that "acquisition" is used as a concept that a request is not essential. That is, the process of receiving data without the request of the CPU 11 is also included in the concept of "the CPU 11 acquires data". Further, "data" in the present specification is represented by a computer-readable bit string. Data having substantially the same meaning and different formats are treated as the same data. The same applies to "information" in this specification. Further, "request" and "instruct" are concepts indicating that information indicating that a request is being made and information indicating that an instruction is being made are output to the other party. Further, the information indicating that the request is being made and the information indicating that the instruction is being made are also simply referred to as "request" and "instruction".

In addition, the process of the CPU 11 of determining whether or not the information A indicates a matter B may be conceptually described as "to determine whether or not it is the matter B from the information A". The process of the CPU 11 of determining whether the information A indicates the matter B or a matter C may be conceptually described as "to determine whether it is the matter B or the matter C from the information A".

Next, booklet printing will be described. Booklet printing is a printing mode in which a booklet is formed by printing two pages each on both sides of a sheet, stacking a plurality of printed sheets, and folding the stacked printed sheets in half. That is, the booklet printing is a printing mode realized by combining the function of 2-in-1 printing and the function of double-sided printing.

The 2-in-1 printing is an aggregate printing in which images for two pages of image data are arranged on one surface of one sheet. Images for two pages of image data are arranged in a reduced size and printed on one surface of one sheet according to the size of the sheet.

Double-sided printing is a printing mode in which printing is performed on two sides, the front side and the back side of the sheet. When performing double-sided printing automatically, the printer 2 conveys a sheet picked-up from the sheet feed tray along the print path, and the printing unit prints an image on the back side of the sheet (the lower surface when the sheet is stored in the sheet feed tray). The printer reverses the conveying direction of the sheet and prints an image on the front side of the sheet before the sheet on the back side of which has been printed is discharged to the sheet discharge tray. Since the sheet discharged to the sheet discharge tray is printed on both sides in a state where the sheet is turned upside down by reversing the conveyance direction, the image printed on the front side is in a state of being reversed by 180 with respect to the image printed on the back side.

Subsequently, the above-described single-sheet conveyance method, two-sheet simultaneous conveyance method, and interleave method will be described. The single-sheet conveyance method is a conveyance method used in a printing procedure that starts printing on the next sheet after printing on both sides of the first sheet. In the single-sheet conveyance method, the printer feeds the next sheet after printing on both sides of the first sheet is completed. That is, in the single-sheet conveyance method, the printer does not convey another sheet on the print path while conveying one sheet. Further, the printer prints from the back side of the sheet first, and then prints the front side. Therefore, a printer that adopts the single-sheet conveyance method executes double-sided printing in the order of the back side of the first sheet, the front side of the first sheet, the back side of the second sheet, and the front side of the second sheet.

The two-sheet simultaneous conveyance method is a conveyance method used in a printing procedure that starts printing on the next sheet after printing on one surface (back side) of the sheet and before starting printing on the other surface (front side). In double-sided printing using the two-sheet simultaneous conveyance method, the printer conveys the first sheet to the print path and prints the back side of the sheet. Then, the printer prints the back side of the second sheet before reversing the conveyance direction of the first sheet and printing the front side of the first sheet. Then, the printer prints on the front side of the first sheet and discharges the first sheet to the discharge tray. After that, the printer prints the front side of the second sheet and discharges the second sheet to the sheet discharge tray in the same manner as the first sheet. Therefore, in the two-sheet simultaneous conveyance method, there is a timing at which two unprinted sheets are simultaneously conveyed.

In the two-sheet simultaneous conveyance method, the printer performs printing on the next third sheet after double-sided printing on both the first sheet and the second sheet is completed. Specifically, when the printer performs double-sided printing by the two-sheet simultaneous conveyance method, printing is performed in the order of the back side of the first sheet, the back side of the second sheet, the front side of the first sheet, the front side of the second sheet, and the back side of the third sheet.

In the interleave method, sheets are conveyed as in the two-sheet simultaneous conveyance method except that the first sheet and the third sheet are conveyed on the print path while the conveyance direction is reversed and the second sheet is conveyed. When performing double-sided printing by conveyance in the interleave method, the printer performs printing in the order of, for example, the back side of the first sheet, the back side of the second sheet, the front side of the first sheet, the back side of the third sheet, the front side of the second sheet, the back side of the fourth sheet, and the front side of the third sheet.

Next, an example of a printing procedure including the operation of the auxiliary program 42 of this embodiment will be described with reference to FIGS. 3 to 7. The PC 1 of the present embodiment is configured to cause the printer 2 to perform booklet printing by using the auxiliary program 42. The general-purpose print program 41 of this embodiment does not need to support booklet printing.

Figure 3:
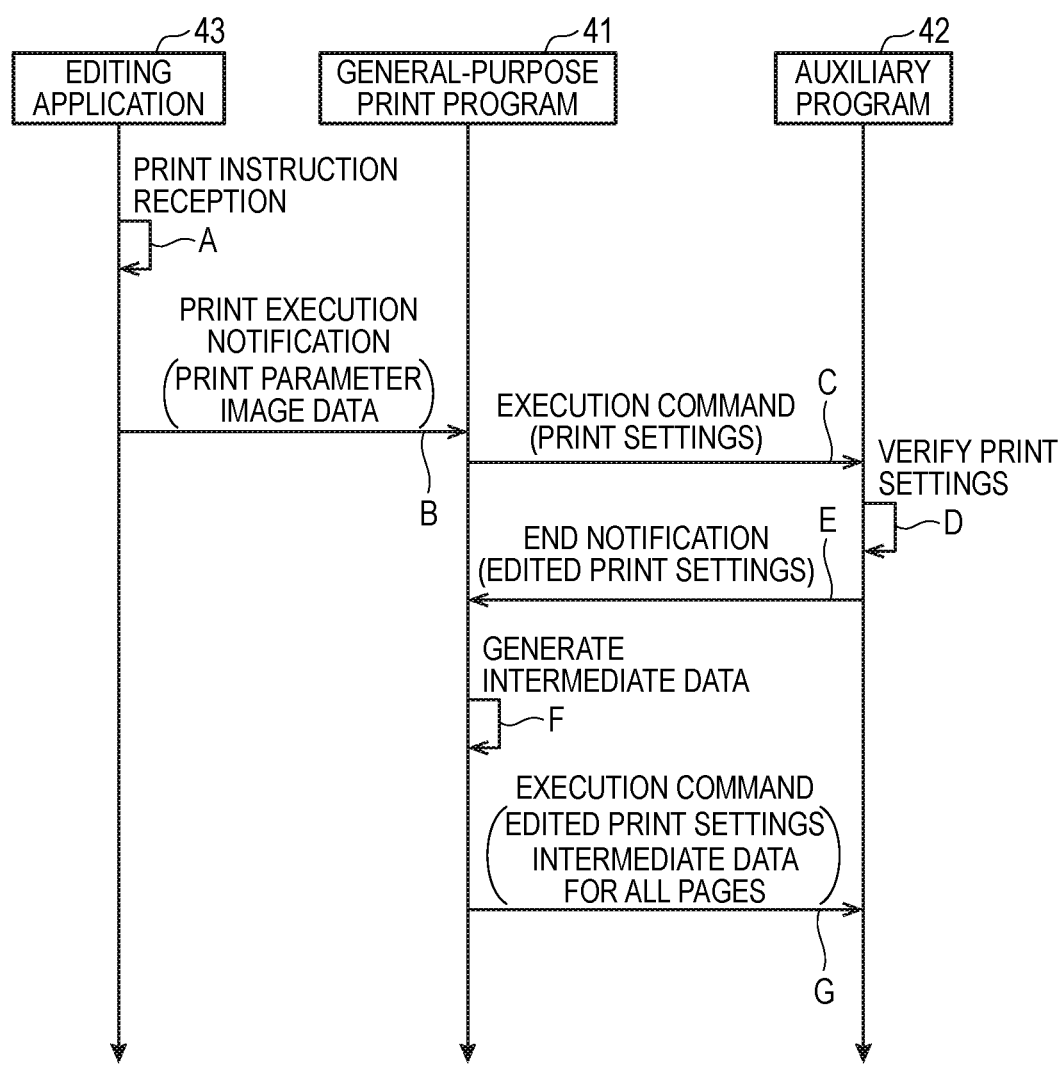
FIG. 3 is a sequence diagram illustrating an example of the order of operation of a first embodiment.

First, as shown in FIG. 3, the editing application 43 receives the designation of an image to be printed and input of a print execution instruction via the UI 20 (arrow A). The image to be printed is images of a plurality of pages. The editing application 43 receives an instruction to set a document edited by the editing application 43 or a photo read by the editing application 43 as an image to be printed. Then, the editing application 43 that has received the print instruction passes a print execution notification indicating the content of the received print instruction to the OS 21. In FIG. 3, the operation of the OS 21 is omitted.

When the OS 21 receives a print execution notification using the general-purpose print program 41, the OS 21 executes the general-purpose print program 41 and passes the print execution notification to the general-purpose print program 41 (arrow B). In the print execution notification, the general-purpose print program 41 is configured to acquire various information included in the print instruction, for example, information indicating a printer to print, information indicating print settings set by the editing application 43, and information indicating image data to be printed.

The general-purpose print program 41 specifies the printer designated as the device that executes printing, based on the information included in the print execution notification. If the designated printer is the printer 2, since the auxiliary program 42 corresponding to the printer 2 is stored in the memory 12, the general-purpose print program 41 outputs the execution command of the processing of the auxiliary program 42 and operates the auxiliary program 42 (arrow C). That is, in response to the detection of the print execution notification by the general-purpose print program 41, an execution command to the auxiliary program 42 is output from the general-purpose print program 41.

The auxiliary program 42 executes various processes based on the content of the execution command from the general-purpose print program 41. In the execution command of arrow C, the general-purpose print program 41 passes the print settings received by the editing application 43 to the auxiliary program 42 and requests the verification of the print settings.

The auxiliary program 42 verifies the print settings based on the execution command of arrow C (arrow D). The auxiliary program 42 determines whether or not the received print settings are compatible with the functions of the printer 2, and the print settings are invalidated if the incompatible print settings are included, for example, a size of sheet not set in the printer 2 is selected.

The auxiliary program 42 of the present embodiment is configured to receive changes in print settings or additional settings during the execution of the process indicated by arrow D. In the following, a case where the auxiliary program 42 receives the setting for booklet printing with arrow D will be described. That is, the print setting passed in the process of arrow C does not include the booklet printing setting, and the print setting at the end of the process of arrow D includes the booklet printing setting.

If the editing application 43 is capable of receiving the booklet printing setting, the print setting passed to the auxiliary program 42 in the process of arrow C may include the booklet printing setting. For example, when the general-purpose print program 41 supports booklet printing, print settings including the booklet printing settings may be passed to the auxiliary program 42 in the process of arrow C. Alternatively, even when the general-purpose print program 41 does not support booklet printing, for example, booklet printing settings may be passed from the editing application 43 to the auxiliary program 42 via a storage area commonly used by the editing application 43 and the auxiliary program 42.

For example, the auxiliary program 42 uses the UI 20 to display a print setting screen corresponding to the function of the printer 2. The auxiliary program 42 receives settings related to booklet printing via this print setting screen. For example, the print setting screen includes basic setting items including sheet type, sheet size, printing orientation, selection of double-sided printing, selection of booklet printing, and the like.

When booklet printing is selected, the auxiliary program 42 further displays, using the UI 20, an item for setting the binding method, an item for setting the binding margin, and setting items for dividing volumes. If the printer 2 includes a post-processing device, the UI 20 may display a setting as to whether or not to create a booklet using the device.

The setting items related to the volume division include an item for selecting whether to form a booklet by stacking all sheets without dividing volumes or by dividing volumes. Further, in the setting item related to the volume division, the number of sheets for one volume may be set. When the printer 2 has a function of automatically dividing volumes so that the number of sheets of one volume is even, whether or not to automatically divide volumes may be set in a setting item related to the volume division. When the OK button is operated in a state where various settings related to booklet printing has been input, the auxiliary program 42 receives the settings related to booklet printing using the UI 20.

As shown in FIG. 3, when the auxiliary program 42 finishes verifying the print settings, the auxiliary program 42 passes an end notification to the general-purpose print program 41 (arrow E). Edited print settings including booklet printing settings are attached to the end notification. Upon receiving the end notification, the general-purpose print program 41 generates intermediate data by converting the image data format included in the print execution notification into the intermediate data format, and generates a print job including the intermediate data (arrow F). The image data included in the editing application 43 is of various types, and the general-purpose print program 41 converts the received image data into intermediate data suitable for generating print data. If the image data included in the print execution notification is data suitable for generating print data, the generation of intermediate data may be omitted and the intermediate data may be used as it is. The intermediate data is, for example, XPS data. For example, as shown in FIG. 7A, the page order of the intermediate data generated by the process of arrow F is the same as the page order of the image data given to the print execution instruction.

The general-purpose print program 41 passes an execution command to edit the intermediate data to the auxiliary program 42 (arrow G). the edited print settings and the intermediate data generated in the process of arrow F are attached to the execution command. The intermediate data received by the auxiliary program 42 in the process of arrow G is an example of print data and print intermediate data.

Figure 4:
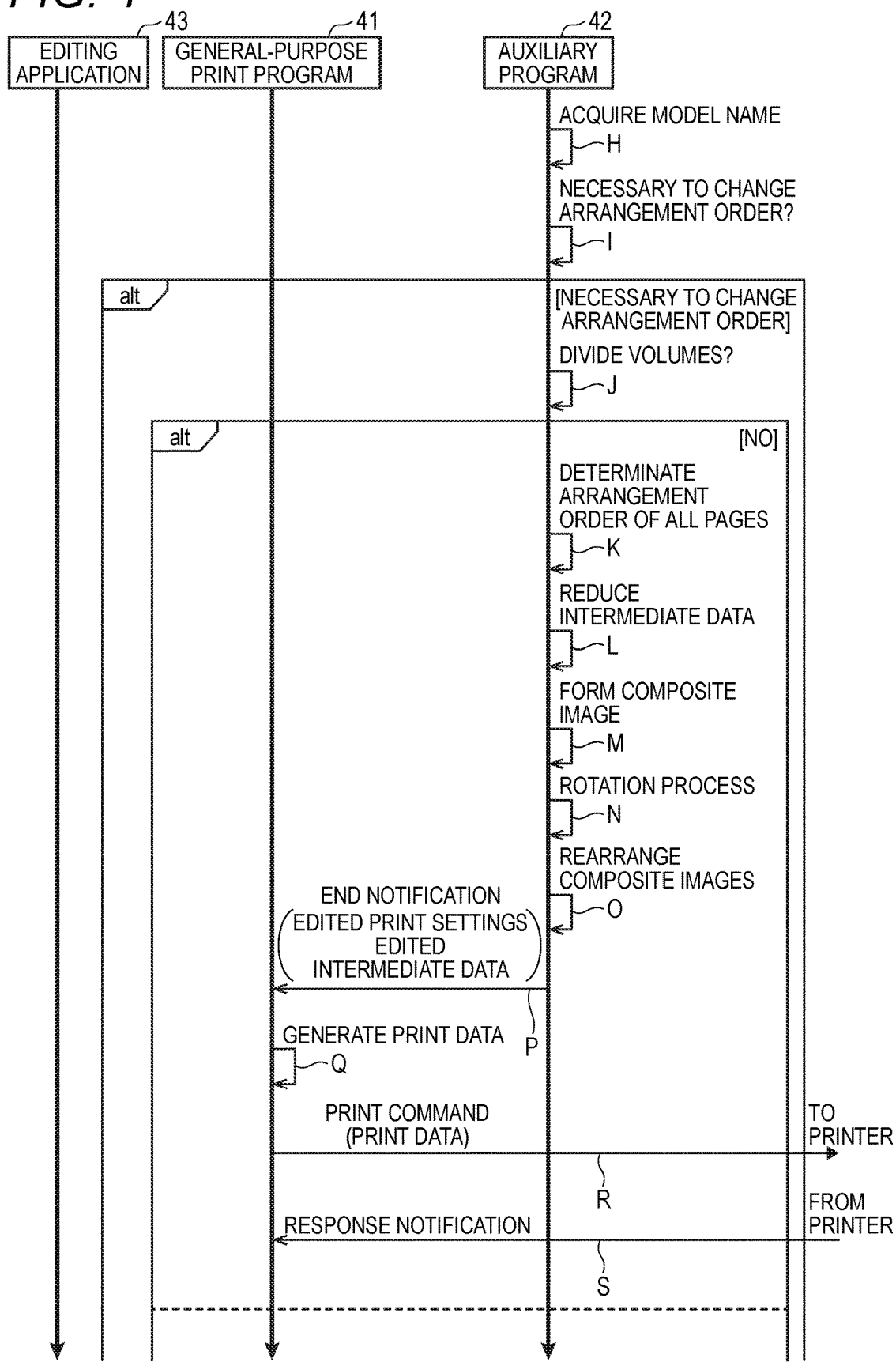
FIG. 4 is a sequence diagram illustrating an example of the order of operation of the first embodiment.

As shown in FIG. 4, when the auxiliary program 42 receives the intermediate image data for the images of a plurality of pages from the general-purpose print program 41, the auxiliary program 42 acquires the model name (arrow H). For example, the auxiliary program 42 inquires the OS 21 for the model name of the printer 2 and acquires the model name of the printer 2 from the OS 21. The model name may be acquired by directly inquiring the printer 2. The model name may be acquired immediately before the process of changing the arrangement order shown by arrow K or arrow b described later.

After acquiring the model name, the auxiliary program 42 determines whether or not the arrangement order needs to be changed based on the model name (arrow I). For example, as shown in FIG. 2, when the acquired model name is "M1" or "M2", "necessary" is stored in the rearrangement necessity information. In this case, the auxiliary program 42 determines that the arrangement order needs to be changed and executes the processes of arrow J to arrow S shown in FIG. 4 or arrow a to arrow o shown in FIG. 5. On the other hand, as shown in FIG. 2, for example, when the acquired model name is "M3", "unnecessary" is stored in the rearrangement necessity information. In this case, the auxiliary program 42 determines that it is not necessary to change the arrangement order and executes the processes of arrow t to arrow v shown in FIG. 5.

That is, if it is determined in the process of arrow I in FIG. 4 that the arrangement order needs to be changed, the auxiliary program 42 determines whether to divide volumes (arrow J). In the process of arrow D in FIG. 3, if the auxiliary program 42 receives the setting of stacking all the sheets to form a booklet without dividing volumes, the auxiliary program 42 determines that the volumes are not divided. On the other hand, if the auxiliary program 42 receives the setting of dividing the volumes to form a booklet in the process of arrow D, the auxiliary program 42 determines that the volumes are to be divided.

When it is determined in the process of arrow J to divide the volumes, the auxiliary program 42 determines the image arrangement order according to the number of pages in the process of arrow G based on the intermediate data received from the general-purpose print program 41 (arrow K). The intermediate data is data corresponding to images having a plurality of pages and the auxiliary program 42 determines the arrangement order for all pages of the intermediate data.

The auxiliary program 42 generates intermediate data by reducing the sizes of images of the pages whose arrangement order has been determined (arrow L) and forms composite images by arranging the reduced images at a position suitable for 2-in-1 printing (arrow M). That is, the auxiliary program 42 generates a composite image in which the images corresponding to the two target pages are arranged to fit on one surface of each sheet, based on the arrangement order determined by the process of arrow K. The reduction and the arrangement may be reversed. Since the image is adjustable by setting the sheet size, the general-purpose print program 41 may be used for reducing the image instead of the auxiliary program 42.

Figure 6A:
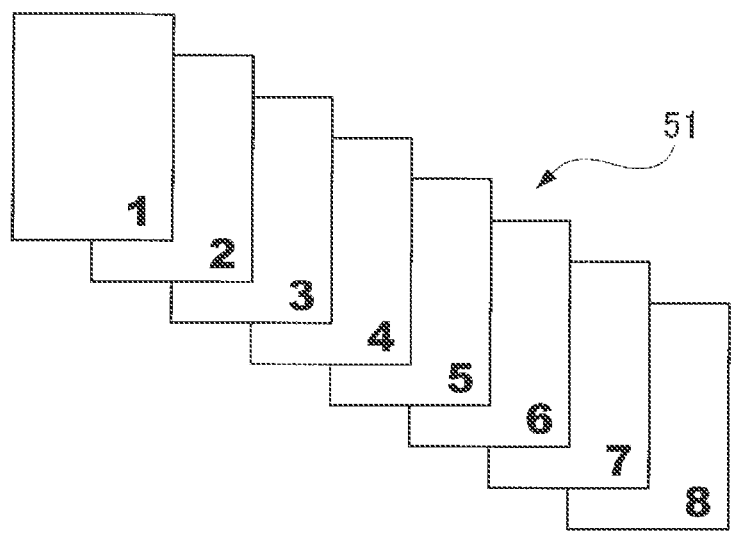
FIGS. 6A to 6D are diagrams illustrating booklet printing.
Figure 6B:
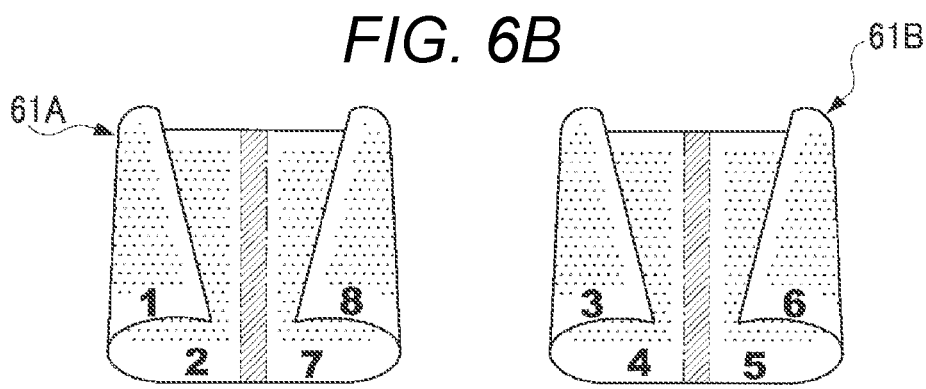
Figure 6C:
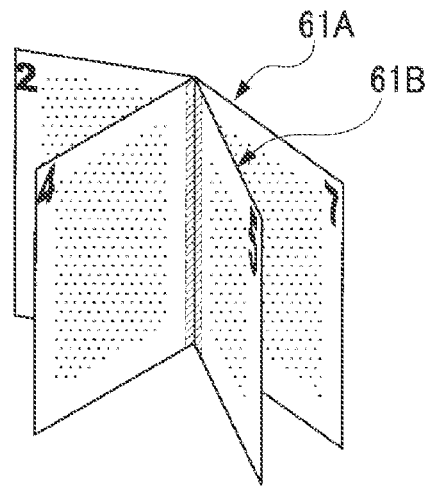
Figure 6D:
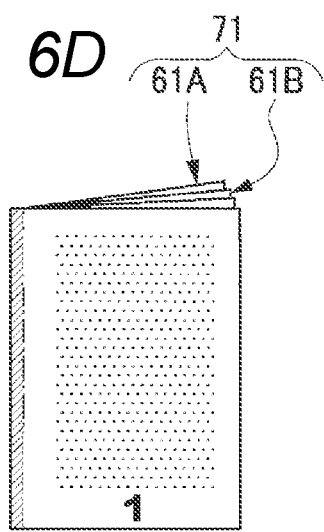

The processes of arrow K to arrow M will be described by taking as an example the case where a left bound booklet 71 is formed as shown in FIGS. 6C and 6D for an 8-page original document 51 shown in FIG. 6A. In this case, in the process of arrow D shown in FIG. 3, the printing direction "vertical" and the binding direction "left binding" are set as the binding method.

As shown in FIG. 7A, the auxiliary program 42 receives, from the general-purpose print program 41, intermediate data in which images of pages 1 to 8 are arranged in order. When the original document 51 is printed to form a booklet, as shown in FIG. 6B, a first sheet 61A has pages 1 and 8 printed on one side and pages 2 and 7 on the opposite side. Further, a second sheet 61B has pages 3 and 6 printed on one side and pages 4 and 5 printed on the opposite side. Therefore, as shown in FIG. 7B, the auxiliary program 42 rearranges the page order of the intermediate data received from the general-purpose print program 41 into the order of page 8, page 1, page 2, page 7, page 6, page 3, page 4, and page 5.

Then, as shown in FIG. 7C, the auxiliary program 42 reduces the image of each page so that the image for one page fits in the half area in the longitudinal direction of the sheet. Then, the auxiliary program 42 rotates each reduced image by 90°, as shown in FIG. 7D. Further, as shown in FIG. 7E, the auxiliary program 42 arranges the images rotated by 90° in two positions on one surface and composes the images. As a result, intermediate data of the composite image printed on each surface is generated.

For example, the process of rotating the image by 90 may be performed as necessary. For example, when the original document 51 is printed as a booklet and the binding method is set to the printing direction "horizontal" and the binding direction "left binding", the image is reduced and then images for two pages may be arranged at two positions on one surface without rotating the reduced image.

After that, as shown in FIG. 4, the auxiliary program 42 rotates the composite image to be printed on the back side by 180 (arrow N) as necessary and rearranges the processing order of the composite images (arrow O). That is, the auxiliary program 42 refers to the auxiliary DB 44, specifies the conveyance method based on the model name acquired in the process of arrow H, and rearranges the processing order of the composite images formed on each side of the sheet according to the specified conveyance method and the size of the sheet (including the vertical orientation and the horizontal orientation).

For example, when the model name acquired in the process of arrow H is "M", the auxiliary program 42 extracts the "single-sheet conveyance method" associated with the model name "M1" from the auxiliary DB 44 shown in FIG. 2. As described above, the single-sheet conveyance method printer performs printing in the order of the back side of the first sheet→the front side of the first sheet→the back side of the second sheet→the front side of the second sheet. Then, when the sheet is in the vertical orientation, the auxiliary program 42, as shown in FIG. 7F, rearranges the composite image of page 2 and page 7 to be formed on the back side of the first sheet before the composite image of page 8 and page 1 to be formed on the front side of the first sheet and rearranges the composite image of page 4 and page 5 to be formed on the back side of the second sheet before the composite image of page 6 and page 3 to be formed on the front side of the second sheet.

If the specified conveyance method is the "two-sheet simultaneous conveyance method", the printer of the two-sheet simultaneous conveyance method performs printing in the order of the back side of the first sheet, the back side of the second sheet, the front side of the first sheet, the front side of the second sheet. Then, when the sheet is in the vertical orientation, the auxiliary program 42, as shown in FIG. 7G, rearranges the composite images in the order of the composite image of pages 2 and 7 to be formed on the back side of the first sheet, the composite image of pages 4 and 5 to be formed on the back side of the second sheet, the composite image of pages 8 and 1 to be formed on the front side of the first sheet, and the composite image of pages 6 and 3 to be formed on the front side of the second sheet.

As a further example, when the model name acquired in the process of arrow H is "M1", the auxiliary program 42 extracts the "single-sheet conveyance method" associated with the model name "M1" from the auxiliary DB 44 shown in FIG. 2. The single-sheet conveyance method printer performs printing in the order of the back side of the first sheet, the front side of the first sheet, the back side of the second sheet, the front side of the second sheet. Then, when the sheet is in the horizontal orientation, the auxiliary program 42, as shown in FIG. 7H, rearranges the composite image of pages 2 and 7 to be formed on the back side of the first sheet before the composite image of pages 8 and 1 rotated by 180° to be formed on the front side of the first sheet and rearranges the composite image of pages 4 and 5 to be formed on the back side of the second sheet before the composite image of pages 6 and 3 rotated by 180° to be formed on the front side of the second sheet.

After the process of arrow O shown in FIG. 4, the auxiliary program 42 outputs an edited print setting and an end notification with edited intermediate data including a composite image (arrow P). The edited intermediate data is an example of composite intermediate data. The general-purpose print program 41 that has received the end notification rasterizes the edited intermediate data to generate print data (arrow Q). The print data is data rasterized by the processes of arrow I to arrow O for composite images in which the images for the targeted two pages are arranged so as to fit on one surface of each sheet. The print data generated by the general-purpose print program 41 is print data in a format that can be used for printing by various printers. The print data is, for example, PWGRaster data or PDF data.

The general-purpose print program 41 outputs a print command with the generated print data to the printer 2 (arrow R). The output print data is an example of composite print data.

The printer 2, which has received the print command in the process of arrow R, prints the print data. That is, the printer 2 prints the images of the print data in the order of reception and the printer 2 itself does not rearrange the images in the order of printing. The general-purpose print program 41 receives a response notification from the printer 2 (arrow S). In this case, the general-purpose print program 41 may notify the editing application 43 of the print result in response to the response notification.

Figure 5:
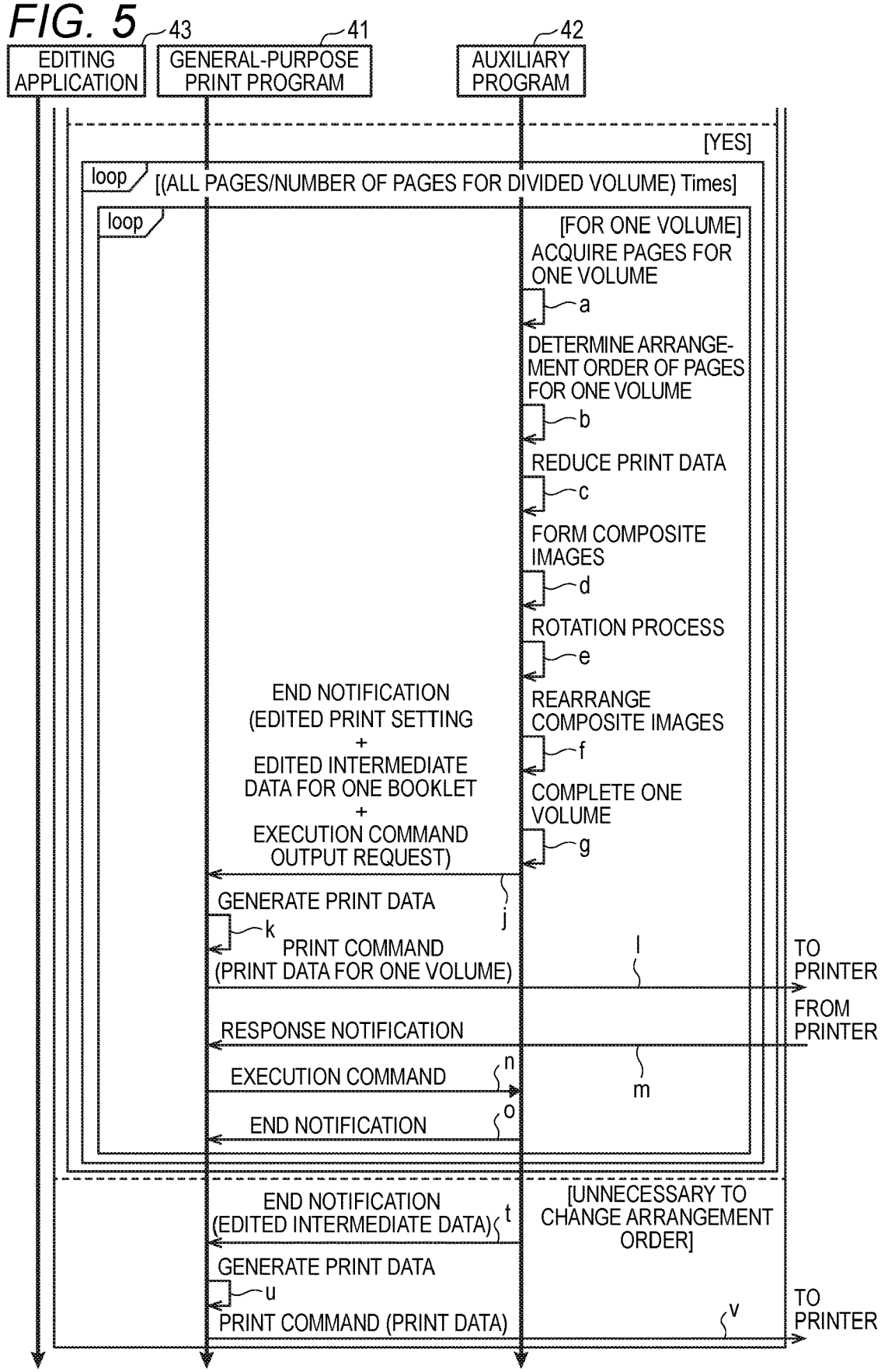
FIG. 5 is a sequence diagram illustrating an example of the order of operation of the first embodiment.

On the other hand, when it is determined in the process of arrow I that the arrangement order needs to be changed and determined in the process of arrow J that the volumes are divided, the auxiliary program 42 determines the arrangement order in units of the number of pages in one volume and outputs the print data, as shown in FIG. 5.

That is, the auxiliary program 42 acquires the intermediate data of the pages corresponding to one volume from the beginning of the intermediate data of the images having a plurality of pages acquired from the general-purpose print program 41 in the process of arrow G (arrow a). The number of pages of the intermediate data to be acquired is specified by, for example, the number of pages of one volume received in the process of arrow D.

The auxiliary program 42 determines the image arrangement order of the intermediate data acquired in arrow a according to the number of pages corresponding to one volume (arrow b). For example, when the auxiliary program 42 receives the intermediate data of 100 pages from the general-purpose print program 41, receives the setting of dividing the volumes to form a booklet in the process of arrow D, and sets the number of pages for one volume to 8 pages, the images from page 1 to page 8 are rearranged as shown in FIG. 7B.

Then, the auxiliary program 42 performs the reduction processing (arrow c), the composite image forming processing (arrow d), the 180° rotation process (arrow e) as necessary, and the rearrangement process of composite images (arrow f), on the intermediate data of the pages whose arrangement order has been determined in the same manner as the above-described processes of arrow L to arrow O.

When the editing of the intermediate data of pages corresponding to one volume is completed (arrow g), the auxiliary program 42 outputs an end notification to the general-purpose print program 41 (arrow j). In this case, the auxiliary program 42 passes the intermediate data of the composite image generated based on the determined arrangement order by the processes of arrow a to arrow f to the general-purpose print program 41 as edited intermediate data. Further, the auxiliary program 42 passes an execution command output request that requests the auxiliary program 42 to output an execution command for processing the next pages corresponding to one volume, to the general-purpose print program 41.

The general-purpose print program 41 rasterizes the edited intermediate data to generate print data (arrow k). The general-purpose print program 41 transmits a print command including the generated print data for one volume to the printer 2 (arrow l). The print data output to the printer 2 is an example of composite print data. The printer 2 prints the image data of the composite images in which the images of pages for one volume are composite according to the number of pages for one volume according to the print command on each side of the sheet. The printer 2 receives a print command and transmits a response notification indicating success or failure of printing to the PC 1 (arrow m). The printer 2 performs printing in the order in which print data for one booklet is received, and does not rearrange images.

Upon receiving the response notification transmitted from the printer 2, the general-purpose print program 41 outputs an execution command to the general-purpose print program 41 in response to the execution command output request received from the auxiliary program 42 in the process of arrow j (arrow n). The auxiliary program 42 that has received the execution command acquires the image corresponding to the pages for the next one volume from the intermediate data for all pages received from the general-purpose print program 41 at arrow G (arrow a). For example, in the case of dividing the intermediate data for 100 pages into units of 8 pages, images from page 9 to page 16 are acquired. Then, with respect to the images acquired by the auxiliary program 42, the processes of arrows b to n are executed.

When the processes of arrow a to arrow n are executed the number of times of dividing all pages of the intermediate data received from the general-purpose print program 41 by the number of pages of one booklet, there is no intermediate data for which the auxiliary program 42 needs to determine the arrangement order. In this case, the auxiliary program 42 passes the end notification to the general-purpose print program 41 without performing the processes of arrow a to arrow g (arrow o). At this time, the auxiliary program 42 does not pass the edited intermediate data. Accordingly, the general-purpose print program 41 detects the completion of printing related to the print job.

In this way, when the auxiliary program 42 receives the setting for dividing the volumes in the process of arrow D, the auxiliary program 42 rearranges and transmits the images in booklet units. As a result, the auxiliary program 42 collectively acquires images of all the pages as shown by arrow I to arrow R in FIG. 4 and compares with the case where the transmission is started after the rearrangement of all the pages is completed, and thus, the initial operation time from the output of the print execution notification to the start of printing by the printer 2 is shortened. For example, the printer 2 may start booklet printing by receiving print data corresponding to eight pages when printing a booklet of a 100-page original document while conveying sheets in the two-sheet simultaneous conveyance method.

On the other hand, when it is determined in the process of arrow H that the arrangement order does not need to be changed, the auxiliary program 42 outputs an end notification as shown in FIG. 5. At this time, the auxiliary program 42 passes the edited intermediate data whose arrangement order has not been changed to the general-purpose print program 41 (arrow t).

The general-purpose print program 41 rasterizes the intermediate data in the same page order as the image included in the print instruction output by the editing application 43 based on the edited intermediate data received from the auxiliary program 42 to generate print data (arrow u). The print data includes the booklet printing setting set by arrow D, that is, an execution instruction of booklet printing.

The general-purpose print program 41 transmits a print command with the generated print data to the printer 2 (arrow v). The printer 2 stores the print data included in the print command in the memory. The printer 2 determines the arrangement order of the images included in the print data according to the execution instruction of booklet printing included in the print data, and generates composite images. Then, the printer 2 prints on each side of the sheet based on the print data of the generated composite images.

Thus, in the case of a model that does not require rearrangement or composition (printing process for arranging images for two pages on one surface of a sheet) of images, the auxiliary program 42 outputs the print data from the PC 1 to the printer 2 without executes the process for rearranging images or composing the images. Therefore, the processes of the auxiliary program 42 become simple.

In the sequence diagram of FIG. 4, the processes of arrow J and arrow O are examples of determination processing, the processes of arrow P to arrow R are examples of composite image output control processing, and the process of arrow H is an example of model acquisition processing. The processes of arrow b and arrow f in FIG. 5 are examples of determination processing, and the processes of arrow j to arrow l are examples of composite image output control processing.

As described above, in the auxiliary program 42 of the present embodiment, when the general-purpose print program 41 (OS 21) has a print instruction and causes the printer 2 to execute booklet printing in a print job based on the print instruction, the auxiliary program 42 rearranges the arrangement order of the images having a plurality of pages according to the number of pages for one volume in the booklet printing (arrow K, arrow O, arrow b, and arrow f). Ten, the auxiliary program 42 controls the PC 1 so as to output the print data of the composite images in the print order according to the sheet conveyance mode of the printer 2 (arrow P to arrow R, and arrow j to arrow l). Accordingly, the auxiliary program 42 supports booklet printing even when the general-purpose print program 41 does not support booklet printing.

Further, in the auxiliary program 42, the support program acquires the model name (arrow H in FIG. 4) and determines the image arrangement order for each model (arrow O in FIG. 4, arrow f in FIG. 5). Thereby, the auxiliary program 42 supports a plurality of models and the usability is improved.

Figure 8:
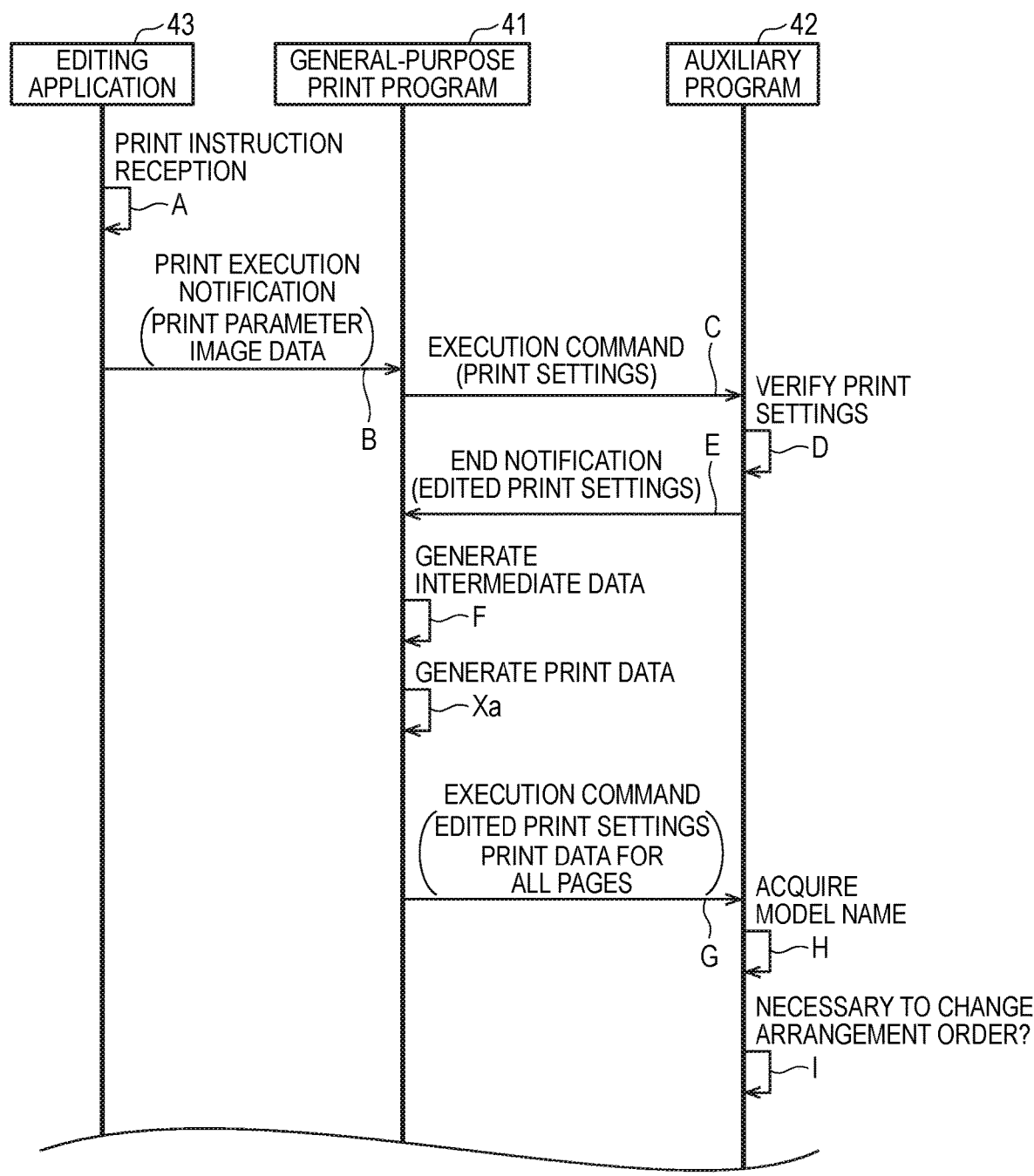
FIG. 8 is a sequence diagram illustrating another example of the order of operation of the first embodiment.

As shown in FIG. 8, the general-purpose print program 41 may generate the print data (arrow Xa) after generating the intermediate data (arrow F) and pass the print data to the auxiliary program 42. That is, the auxiliary program 42 receives print data corresponding to images in which the arrangement order of a plurality of pages is not determined, from the general-purpose print program 41. This print data is an example of print data.

The auxiliary program 42 executes the processing after the above-described arrow H on the received print data. In this case, the processes of arrow P and arrow Q shown in FIG. 4, and the processes of arrow j and arrow k shown in FIG. 5 are omitted, and instead, the auxiliary program 42 passes the edited print data to the general-purpose print program 41 by the end notification. The edited print data is an example of composite print data.

Further, the auxiliary program 42 may execute a process of directly outputting the edited print data to the printer 2. In this case, after transmitting the edited print data, the auxiliary program 42 may receive and pass the success or failure of the print data transmission or a response (normal end or error signal) from the printer 2 to the OS 21.

Figure 9:
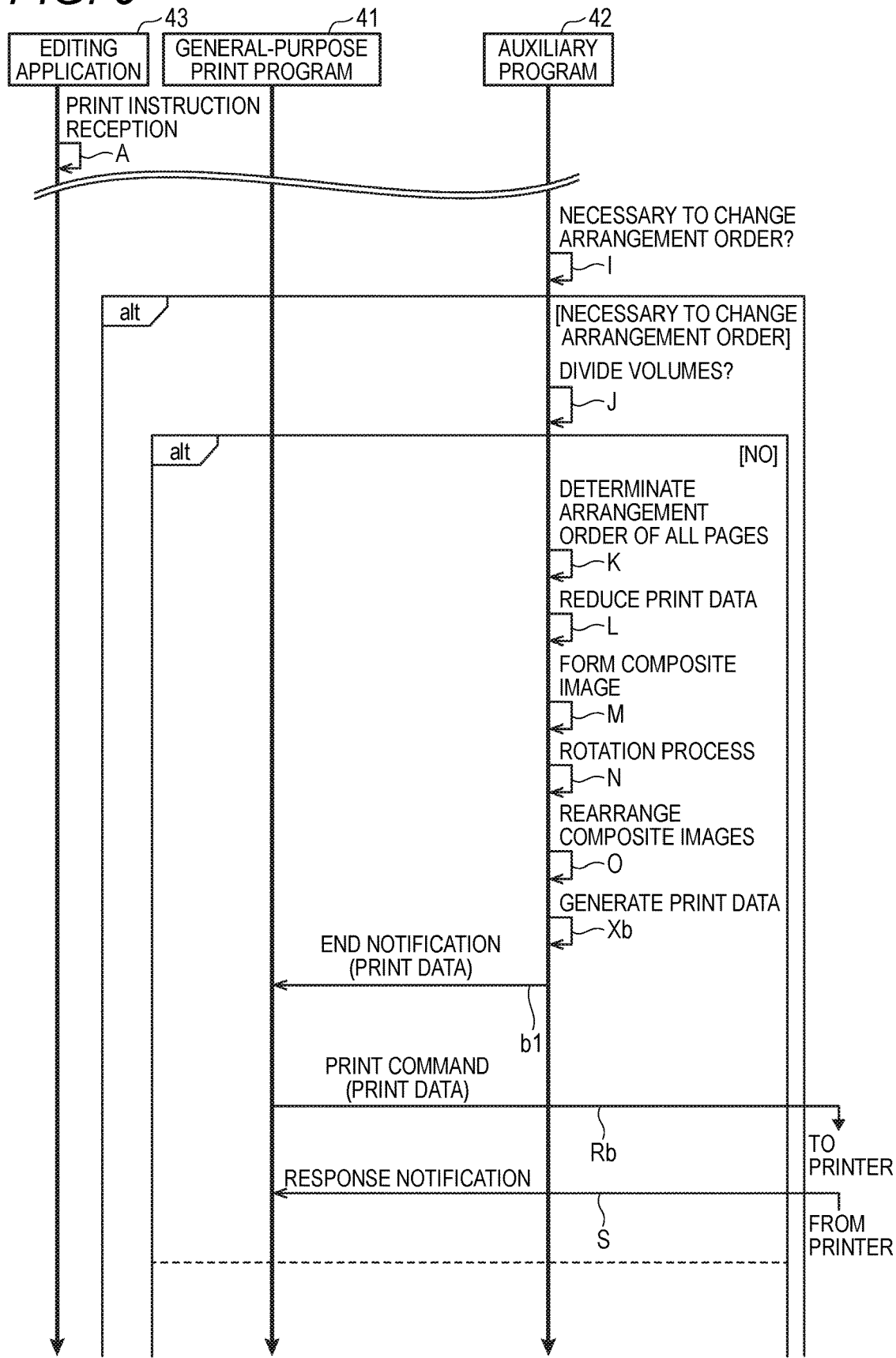
FIG. 9 is a sequence diagram illustrating an example of the order of operation of a second embodiment.
Figure 10:
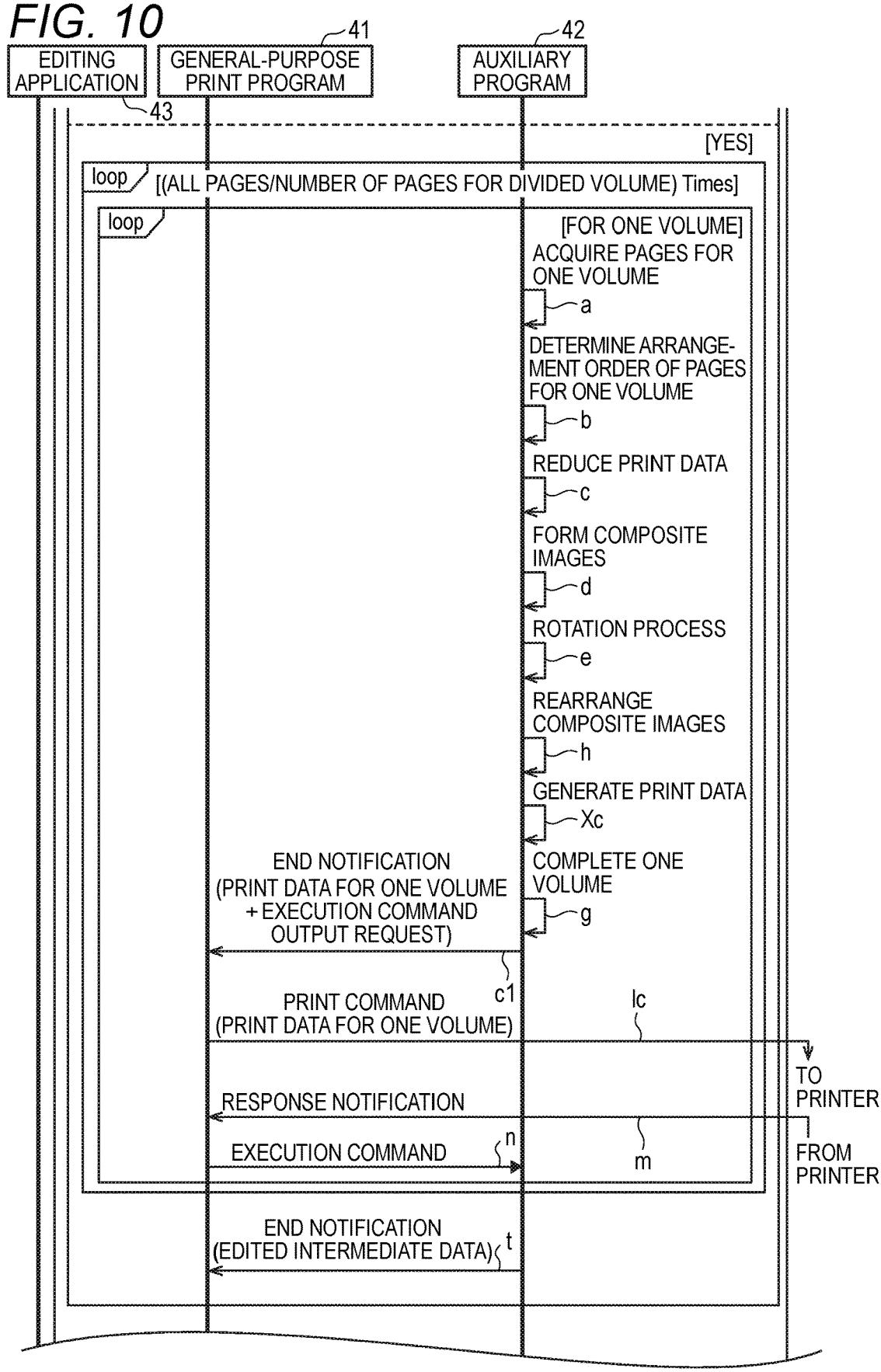
FIG. 10 is a sequence diagram illustrating an example of the order of operation of the second embodiment.

Next, the printing procedure including the operation of the auxiliary program 42 of a second embodiment will be described with reference to the sequence diagrams of FIGS. 9 and 10. This embodiment differs from the first embodiment in that the auxiliary program generates print data. In FIGS. 9 and 10 and the following description, the same processes as those in the first embodiment are designated by the same reference numerals, and the description thereof will be appropriately omitted. Further, the processes similar to but different from those of the first embodiment will use the reference numerals with lower case letters to describe the difference from the first embodiment.

As shown in FIG. 9, the auxiliary program 42 changes the arrangement order of the images of the intermediate data received from the general-purpose print program 41 as indicated by arrow K to arrow O in the drawings, and based on the changed arrangement order, when the intermediate data of the composite image is generated, the intermediate data of the composite image is rasterized to generate print data (arrow Xb). The intermediate data generated by the processes of arrow K to arrow O in the drawings is an example of composite intermediate data. The intermediate data received from the general-purpose print program 41 by the auxiliary program 42 in the process of arrow G omitted in FIG. 9 is an example of the print intermediate data.

The print data generated by arrow Xb is data in a format that is capable of being printed by the printer 2, and is, for example, PDL data dedicated to the model of the printer 2. By rasterizing with the auxiliary program 42, the degree of freedom is greater than in the case of rasterizing with the general-purpose print program 41, and print data suitable for printing with the printer 2 is likely to be generated. The print data generated by arrow Xb may be data in a format that is capable of being used for printing on a printer other than the model of the printer 2. The print data is an example of composite print data.

The auxiliary program 42 passes the print data generated by itself and whose arrangement order is determined, to the general-purpose print program 41 together with the end notification (arrow b1). The general-purpose print program 41 outputs a print command with the received print data to the printer 2 (arrow Rb).

As shown in FIG. 10, the auxiliary program 42 may generate the print data by rasterizing the intermediate data of the composite images generated corresponding to the pages for one volume by the processes of arrow a to arrow h (arrow Xc). This intermediate data is an example of composite intermediate data. The auxiliary program 42 passes the print data for one volume generated by itself to the general-purpose print program 41 together with the end notification (arrow c1). At this time, the auxiliary program 42 passes the execution command output request to the general-purpose print program 41. The general-purpose print program 41 outputs the print command with the received print data for one volume to the printer 2 (arrow Ic). That is, the auxiliary program 42 causes the PC 1 to transmit the print data having a different arrangement order from the images included in the print instruction to the printer 2. This print data is an example of composite print data.

Since the auxiliary program 42 of the second embodiment causes the PC 1 to transmit the print data whose arrangement order has been changed to the printer 2, the printer 2 prints images according to the reception order of the print data without rearranging the images of the print data. Therefore, like the auxiliary program 42 of the first embodiment, the auxiliary program 42 of the second embodiment cause the printer 2 to perform booklet printing even when the general-purpose print program 41 does not support booklet printing.

The present embodiment is merely an example and does not limit the present invention. Therefore, various modifications and changes of the present invention can naturally be made within a range not departing from the gist of the invention. For example, the device connected to the PC 1 is not limited to the printer and may be any other device having a printing function including a multifunction peripheral, a copying machine, a FAX device, and the like. Further, the number of printers connected to the PC 1 may be two or more.

Further, when the auxiliary program 42 supports one type of model, the auxiliary DB 44 may be omitted and the processes of arrow H and arrow I in FIG. 4 may be omitted. According to this, the memory load may be reduced and the processes of the auxiliary program 42 may be simplified.

Further, for example, by omitting the process of arrow J in FIG. 4 and the processes of arrow a to arrow o in FIG. 5, the auxiliary program 42 rearranges the images in units of pages for one volume or transmits data when volume division printing is performed.

Further, in each of the above-described embodiments, only the processing related to booklet printing is described as the operation of the auxiliary program 42 but the auxiliary program 42 may have another role. For example, for print settings other than booklet printing, the general-purpose print program 41 may perform processing for the print settings that is supported by the general-purpose print program 41, and the auxiliary program 42 may perform processing for the print settings that is not supported by the general-purpose print program 41.

If the general-purpose print program 41 is capable of generating print data from the image data included in the print execution notification without intermediate data, for example, the process of arrow F shown in FIG. 3 may be omitted and the print data may be passed from the general-purpose print program 41 to the auxiliary program 42. Further, in the composite image formation (arrow M, arrow d), the binding margin may be set in the verification of the print setting (arrow D), and the image for two pages may be arranged apart from the center of the sheet based on the set value. That is, when the image for two pages is arranged side by side on one surface of the sheet, the auxiliary program 42 may provide an offset area between adjacent images, for example, between the image of page 8 and the image of page 1. In this case, when the booklet 71 is formed by folding the sheets in half, the image for spread two pages becomes easy to see.

Further, the auxiliary program 42 may be a program that receives an instruction from the OS 21 or the general-purpose print program 41 when performing printing using the general-purpose print program 41. For example, a print workflow application (Print Workflow) published by Microsoft Corporation may be used.

Further, in each of the above-described embodiments, the auxiliary program 42 is executed by outputting an execution command from the general-purpose print program 41 to the auxiliary program 42, but the execution timing of the auxiliary program 42 is not limited thereto. For example, the auxiliary program 42 may be executed by directly receiving an execution command from the OS 21, or may be the resident auxiliary program 42. When resident, the auxiliary program 42 may receive an execution command and perform the above-described operation.

Further, in any flowchart disclosed in the embodiments, the plurality of processes in any of the plurality of steps may be arbitrarily changed in execution order or executed in parallel within a range in which there is no contradiction in processing contents.

Further, the processing disclosed in the embodiments may be executed by hardware including a single CPU, a plurality of CPUs, or ASIC, or a combination thereof. Further, the processing disclosed in the embodiments may be realized in various modes including a recording medium recording a program for executing the processing, a method, or the like.

What is claimed is:

1. A non-transitory computer readable medium storing a support application program causing a computer installed in an information processing device to execute a process for a booklet printing by a printer connected to the information processing device, the process comprising:

in a case where a print instruction output from an editing application program installed in the information processing device and causing the printer to print images is sent to a general-purpose print program pre-installed in an operating system of the information processing device, and in a job based on the print instruction, the printer is caused to execute the booklet printing for making a booklet by printing two pages each on both sides of a sheet, stacking a plurality of printed sheets, and folding the stacked printed sheets in half, the printing being performed by the general-purpose print program without using a printer driver, determining an arrangement order of the images according to a number of pages for one volume in the booklet printing based on print data corresponding to the images having a plurality of pages and being received from the general-purpose print program;

performing composite image output control of transmitting composite print data, which is made by rasterizing a composite image in which the images corresponding to two target pages are arranged so as to fit on one surface of each sheet based on the arrangement order determined in the determination of the arrangement order, from the information processing device to the printer.

2. The non-transitory computer readable medium according to claim 1, wherein
the computer includes a database that stores model information indicating a printer model and a sheet conveyance mode of the printer in association with each other,
the process further comprises acquiring the model information of the printer model, and
the determination of the arrangement order includes, to refer to the database, to specify the conveyance mode based on the model information acquired in the acquisition, and to determine the arrangement order of the images based on the specified conveyance mode.

3. The non-transitory computer readable medium according to claim 2, wherein
the database further stores information indicating whether or not the arrangement order of the images needs to be changed,
the information indicating whether or not the arrangement order needs to be changed is associated with the model information in the database,
the process further comprises specifying a necessity of generating the composite print data based on the model information acquired in the acquisition with reference to the database,
in a case where it is specified that the generating the composite print data is necessary, the determination of the arrangement order and the composite image output control are not executed, and
the process further comprises outputting the print data based on the images and including an execution instruction of the booklet printing to the printer without execution, by the computer, of the determination of the arrangement order and the composite image output control, so that the printer determines the arrangement order based on the received print data, and generate the composite print data, in a case where it is specified that the generating the composite print data is not necessary.

4. The non-transitory computer readable medium according to claim 1, wherein
in the composite image output control,
based on the arrangement order determined in the determination, page order of the images of the number of pages corresponding to one volume in the booklet printing is arranged every time a preparation for the images of the number of pages corresponding to one volume is completed in the booklet printing.

5. The non-transitory computer readable medium according to claim 1, wherein
in the composite image output control,
composite intermediate data to be a composite image is generated based on the arrangement order determined in the determination,
the generated composite intermediate data is rasterized to generate the composite print data, and
the generated composite print data is transmitted to the printer.

6. The non-transitory computer readable medium according to claim 1, wherein
in the determination of the arrangement order,
print intermediate data is received from the general-purpose print program as the print data, and
the arrangement order is determined based on the received print intermediate data, and
in the composite image output control, composite intermediate data to be the composite image is generated based on the arrangement order determined in the determination of the arrangement order,
the generated composite intermediate data is passed to the general-purpose print program to instruct rasterization, and
the composite print data generated by the rasterization by the general-purpose print program is transmitted from the information processing device to the printer.

7. The non-transitory computer readable medium according to claim 1, wherein
in the determination of the arrangement order,
rasterized print data is received as the print data from the general-purpose print program, and
the arrangement order is determined based on the received print data, and
in the composite image output control,
the composite print data is generated from the print data based on the arrangement order determined in the determination, and
the generated composite print data is transmitted from the information processing device to the printer.

8. The non-transitory computer readable medium according to claim 6, wherein
in the composite image output control,
the composite print data related to the job is passed to the general-purpose print program, and
the general-purpose print program transmits the passed composite print data to the printer.

9. The non-transitory computer readable medium according to claim 6, wherein
in the composite image output control,
the composite print data related to the job is transmitted to the printer.

10. The non-transitory computer readable medium according to claim 1, wherein
in the composite image output control,
when arranging the images for two pages side by side on one surface of the sheet, an offset area is provided between the images adjacent to each other.

11. An information processing device comprising a computer, wherein
an operating system of the information processing device includes a general-purpose print program that is a pre-installed program,
a support application program corresponding to a printer connected to the information processing device, and an editing application program capable of inputting a print instruction for causing the printer to print an image via the general-purpose print program are installed in the information processing device, and
the computer executes, in a case where the print instruction is output from the editing application program, and in a job based on the print instruction, the printer is caused to execute booklet printing for making a booklet by printing two pages each on both sides of a sheet, stacking a plurality of printed sheets, and folding the stacked printed sheets in half, the booklet printing being performed by the general-purpose print program without using a printer driver,
determination processing in which the support application program receives print data corresponding to images having a plurality of pages from the general-purpose print program, and based on the received print data, determines an arrangement order of the images according to a number of pages for one volume in the booklet printing, and composite image output control processing in which the support application program transmits composite print data which is made by rasterizing a composite image in which targeted images for two pages are arranged so as to fit on one surface of each sheet based on the arrangement order determined in the determination processing by the support application program, from the information processing device to the printer.

12. A printing method which uses a printer and an information processing device connected to the printer, the information processing device including:

an operating system including a general-purpose print program that is a pre-installed program;

a support application program corresponding to the printer; and an editing application program capable of inputting a print instruction for causing the printer to print an image via the general-purpose print program, and the printer being caused to perform printing based on print data generated by the information processing device, the method comprising:

in a case where the print instruction is output from the editing application program, and in a job based on the print instruction, the printer is caused to execute booklet printing for making a booklet by printing two pages each on both sides of a sheet, stacking a plurality of printed sheets, and folding the stacked printed sheets in half, the printing being performed by the general-purpose print program without using a printer driver, receiving, by the support application program, print data corresponding to images having a plurality of pages from the general-purpose print program, determining, based on the received print data, an arrangement order of the images according to a number of pages for one volume in the booklet printing, and transmitting, by the support application program, composite print data which is made by rasterizing a composite image in which targeted images for two pages are arranged so as to fit on one surface of each sheet based on the determined arrangement order, from the information processing device to the printer.

* * * * *